| United States Patent [19] | [11] Patent Number: 4,857,243 |
|---|---|
| Von Blücher et al. | [45] Date of Patent: Aug. 15, 1989 |

[54] PROCESS OF MAKING MICROSPHERULES OF ACTIVATED CARBON

[76] Inventors: Hubert Von Blücher, Freytagstr. 45; Hasso Von Blücher, Columbusstr. 58, both of 4000 Düsseldorf, 1; Ernest De Ruiter, Höhenstr. 57a, 5090 Leverkusen 1, all of Fed. Rep. of Germany

[21] Appl. No.: 138,240

[22] Filed: Dec. 24, 1987

Related U.S. Application Data

[60] Division of Ser. No. 855,195, Apr. 23, 1986, which is a continuation-in-part of Ser. No. 788,279, Oct. 17, 1985, abandoned.

[30] Foreign Application Priority Data

Mar. 21, 1985 [DE] Fed. Rep. of Germany ....... 3510209
Feb. 15, 1986 [EP] European Pat. Off. ........... 86101960

[51] Int. Cl.$^4$ .......................... B29B 9/00; B29C 67/02
[52] U.S. Cl. ......................................... 264/13; 264/15; 264/117; 264/118; 264/131; 264/143; 264/211.11; 264/211.12; 427/217; 427/221; 502/180; 502/406; 502/416
[58] Field of Search ...................... 264/6, 7, 8, 13, 14, 264/15, 115, 117, 118, 129, 131, 141, 143, 211.11, 211.12; 427/215, 217, 221; 502/180, 182, 184, 185, 406, 414, 416, 417

[56] References Cited

U.S. PATENT DOCUMENTS

| 3,077,439 | 2/1963 | Shea, Jr. et al. ................ 264/117 X |
| 3,400,185 | 9/1968 | Kohnle et al. ...................... 264/117 |
| 3,886,093 | 5/1975 | Dimitri .............................. 502/406 |
| 3,901,823 | 8/1975 | Dimitri et al. .................... 502/414 |
| 4,059,544 | 11/1977 | Yamaguchi et al. ........... 427/215 X |
| 4,111,713 | 9/1978 | Beck ................................ 106/288 B |
| 4,169,051 | 9/1979 | Satoh et al. ....................... 210/649 |
| 4,371,454 | 2/1983 | Hisatsugu et al. ............. 264/15 X |
| 4,474,853 | 10/1984 | Watanabe ..................... 427/215 X |
| 4,510,193 | 4/1985 | Blucher et al. ................... 428/196 |
| 4,668,379 | 5/1987 | Rosensweig et al. ........... 208/157 |

FOREIGN PATENT DOCUMENTS

| 10711 | 5/1980 | European Pat. Off. . |
| 2034597 | 1/1972 | Fed. Rep. of Germany ...... 427/215 |
| 3304349 | 8/1984 | Fed. Rep. of Germany . |
| 141270 | 4/1980 | German Democratic Rep. ................................... 264/118 |
| 57-77018 | 5/1982 | Japan ................................. 423/449 |

*Primary Examiner*—Jeffery Thurlow
*Assistant Examiner*—Leo B. Tentoni
*Attorney, Agent, or Firm*—Sprung Horn Kramer & Woods

[57] ABSTRACT

A method of making activated carbon microspherules including kneading activated carbon particles of a size below 100 μm, together with a dispersion of a water-insoluble synthetic resin to form an intimate mixture; pressing the mixture through a screen having holes related to the size of the desired microspherules; powdering the pressed material; and granulating and drying the resulting microspherules.

6 Claims, No Drawings

PROCESS OF MAKING MICROSPHERULES OF ACTIVATED CARBON

This is a division, of application Ser. No. 855,195, filed Apr. 23, 1986, now pending, which is a Ser. No. 788,279, filed Oct. 17, 1985, now abandoned.

BACKGROUND OF THE INVENTION

The use of activated carbon for purifying liquids or gases is generally known in the art. A detailed description is rendered in the book of H. von Kienle and E. Bader "Aktivokhle und ihre industrielle Anwendung", Ferdinand Enke Verlag, Stuttgart 1980.

The use of pulverulent activated carbon is not possible for many purposes so that one has to switch over to die-pressed or molded carbon (Formkohle). the use in the form of blanks, for example, for pharmaceutical purposes, is of secondary importance.

Molded carbon is characterized by high activity and good hardness. Its regular, often rod-shaped configuration is particularly advantageous for use in charging filters.

Molded or shaped carbon is, for example, manufactured from ground pit coal and a pitch binder. The mixture is pressed to strands by means of an extruder, if desired, cut down, and the so-obtained sausage-shaped articles or cylinders are then smouldered, i.e. carbonized, and activated. Limits are set by the process technology as to the minimum dimension, which is in the range of approximately one millimeter.

Other methods are applied for producing spherical particles, in particular microspherules. For example, a dispersion is prepared from bitumen under pressure, above its softening point, in a medium which is not miscible therewith, such as water, said dispersion being quenched, the so-obtained bitumen spherules extracted with a suitable solvent, oxidized, carbonized and finally activated.

An alternative method for preparing carbonized carbon spherules from bitumen consists in spraying molten bitumen to obtain the desired droplet size and feeding these droplets together with an inert gas through a zone heated to between 800° C. and 1600° C. By virtue of this treatment, first the outer layer of the droplets is carbonized and thereafter the interior surface of the bitumen.

The activated carbon spherules thus produced have a hard shell and a somewhat softer core. For instance, spherule diameters of from 0.1 to 1 mm, with a relatively large size distribution. The abrasion resistance is very high by virtue of the particularly hard core. The inner surface amounts to approximately 600 to 1500 m$^2$/g, with a relatively high component of mesopores ($10-15 \times 10^{-10}$ m).

Another possibility of producing activated carbon spherules comprises heating organic cation exchangers in a fluidized bed rapidly to 600°–700° C. and thereafter activating the same, for example, with water vapor. The strength of the resulting absorber spherules is satisfactory for most applications, although it is a little lower than that of the material prepared from bitumen.

DESCRIPTION OF THE PREFERRED EMBODIMENTS

The object of the invention is to produce in a simpler manner spherical, or approximately spherical, particles exhibiting a high activated carbon component and a controllable size between 0.1 and 1 mm and at the same time a narrow size distribution.

This is effected according to the invention by kneading activated carbon particles of a size below 100 μm together with the dispersion of a water-insoluble synthetic resin to form an intimate mixture; pressing the latter through a screen plate having holes adapted to the size of the desired microspherules; powdering, pelletizing and drying the so-obtained microspherules. When thermosetting synthetic resins are used, hardening may follow thereupon to have the same effective mass as a solid sphere of the same diameter.

Another possibility for manufacturing the microspherules from activated carbon in accordance with the invention wherein activated-carbon particles of less than 100 μm in size are bonded with a synthetic resin that is insoluble in water consists in accordance with the invention of placing active-carbon particles of less than 100 μm in size in a pelletizer equipped with a vortexer and little by little adding an aqueous dispersion of the water-insoluble synthetic resin during the operation until microspherules of the desired size form, turning off the vortexer but allowing the pelletizer to continue operating, immediately powdering the microspherules off, and drying, sorting, and if necessary metallizing them.

The two aforesaid methods yield microspherules with diameters of the more than 0.1 mm, concentrated in a range of 0.3 to 0.6 mm. Microspherules smaller than 0.1 mm can be desirable for special applications, in which case spray drying is appropriate, even thoguh larger sperules can also be produced thereby. A liquor consisting essentially of finely milled activated carbon, binder dispersion, and water is in this method sprayed into a spray tower through nozzles, and the droplets dried with an opposing current of hot air under conditions such that the temperature of the droplets or of the microspheres resulting therefrom does not exceed 120° C. The powerful interior pressure that occurs during the drying produces a small hollow inside the spheres, usually 10 to 20% of the total volume. Since the inside of the sphere participates in adsorption processes only after a certain delay (due to slow diffusion of the adsorbate into the core from the outer layers), a hollow sphere can theoretically be considered to have the same mass as a solid sphere.

The invention departs from activated carbon powder having particles smaller than 100 μm, preferably smaller than 50 μm. Pulverulent carbon of the kind is prepared by very fine grinding and has a particle size of from 0.1–50 μm, preferably from 1–10 μm. For example, activated carbon may attain particle sizes of 95% under 3 μm with the help of jet mills.

In another commercial product, 98% are smaller than 62 μm and 65% smaller than 22 μm for example. Such activated carbons may exhibit predetermined pore sizes and at the same time a very high inner surface of up to 2000 m$^2$/g.

Because pulverulent activated carbon is mostly prepared from vegetable raw materials, also the finely ground particles have mostly a sharp-edged structure, as can be seen under the microscope. For this reason, in spite of the lubricating effect of the water-insoluble synthetic resin of the utilized dispersion, relatively great amounts of water are necessary to knead the pulverulent carbon with the dispersion to an intimate mixture which can then be pressed through screens, perforated plates or the like. This is done, for example, by means of double screw-type extruders, having screws that are surrounded at their end portions with screen-like sheathings. Another possibility is to arrange a screen plate at the end of conventional extruders.

In both cases, the diameter of the outlet openings for the intimate mixture of powdered carbon and synthetic resin dispersion should be from 0.1 to 1 mm, preferably from 0.3 to 0.7 mm. The discharged mass has then the shape of fine strands which, when their consistency is correctly adjusted, break into pieces several diameters long.

If one tries to convert the so-obtained "sausages" or small cylinders into the spherical form by means of the usual pelletizing devices, one does not succeed in obtaining spherules having approximately the diameter of the extruded particles, but substantially larger spherules of very different diameters are formed by agglomeration, which can be of the order of some millimeters to one centimeter or even more. After drying and screening to the desired grain size, spherules of the kind may be serviceable for specific fields of application, however, the object of producing microspherules cannot be thusly realized.

The attempt of reducing the amount of water originating from the synthetic resin dispersion to obtain a drier extrudate which does not coalesce to larger agglomerates when it is pelletized is rapidly limited because then it will not be possible to extrude the mixture. It is very difficult to harmonize the consistency necessary for shaping the extrudate into microspherules, the necessary binder component in the finished product, and the pliability of the mass required for extrusion, including the water content.

Surprisingly enough, it was found that one succeeds in obtaining from the very fine strands of the intimate mixture of the activated carbon powder with the synthetic resin dispersion microspherules having approximately the same diameter as the strands if the extruded strands are powdered with a fine powder between their exit from the screen plate and their feed on the granulating or pelletizing device. Graphite or the same carbon powder that is used according to the invention are preferably utilized. One can also use powders of substances which are desired for modifying the activated carbon, such as constituents selected from the group consisting of flameproofing agents, in particular antimony trioxide, metal powder (e.g. Al, Ni) or other adsorbent materials, in particular silicic acid xerogels, metal oxides and hydroxides, in particular aluminum oxide and hydroxide, and molecular sieves.

The powdering may be continued on the granulating plate or the pelletizing device. The amount of powder used for the powdering operation is advantageously selected in such a manner that a subsequent screeing from finely divided particles is not necessary. A few weight percent, based on the extruded strands, is usually enough. At all events, this method allows, with the help of the conventional devices for the production of fine spherules of the kind, e.g. those used in the pharmaceutical industry, in particular the so-called marumerizer, to obtain microspherules having a diaemter of from 0.1 to 1 mm, in particular from 0.3 to 0.7 mm. They can be subsequently dried and allowed to harden, e.g. in a fluidized bed.

The aforesaid problems in processing the particles extruded from the intimate mixture of activated-charcoal powder and synthetic-resin dispersion in known pelletizers or granulators are even more difficult when an attempt is made to directly convert the activated-carbon powder into microspherules by adding a latex binder. The intended sphere diameters cannot be attained even with devices, pelleting or granulating mixers for example, that can be used to obtain particle sizes of less than 1 mm from other powders, but at a considerable level of fineness only a granulate with diameters larger than 2 mm will form. Even when the mixer is provided with a rotating vortexing tool (otherwise known as a vortexer or beater), although the desired small spherules can be maintained while the device is on, as soon as it is turned off, as it must at least to be emptied, larger spheres and blackberry-like aggregates will form again out of the smaller spherules. The utilizable portion was only between 5 and 35%, depending on the type of carbon and binder. Although adding pelletizing adjuvants like bentonites or extremely fine types of cement for example did improve the overall picture, they had a deletrious effect on the moisture resistance and adsorptive properties of the activated-carbon granulates. Only powdering off immediately after turning off the vortexer while keeping the pelletizer on in the method in accordance with the invention was helpful. Powdering off is done in this case with the same powders employed in the aforesaid alternative method of manufacturing the microspherules in accordance with the invention from activated carbon. The subsequent steps of drying, sorting, and if necessary metallizing are also, as in the alternative method, practical once the pelletizing mixer has been emptied into appropriate devices known to those skilled in the art.

It is possible according to the method of the invention to produce microspherules of the specified diameter having a very narrow grain distribution spectrum which can be utilized for most purposes directly, once slight amounts of oversize and undersize particles have been removed, without further screening or sifting. Their synthetic resin component, calculated as dry substance, amounts to approximately 10-100, in particular 15-30, weight percent, based on the amount of dry activated carbon.

Although microsperules are produced from the carbon powder with the help of a water-insoluble synthetic resin, said microspherules usually exhibiting a diameter which is considerably greater than that of the activated carbon particles of the carbon powder, these microspherules are characterized by an inner surface which, compared to that of the utilized carbon powder, is hardly smaller and, depending on the selected activated carbon, amounts to from 600 to 2000 m$^2$/g.

The water-insoluble synthetic resins substantially contribute to this result which according to the method of the invention are added as aqueous dispersion to the carbon powder. The water-insoluble synthetic resin is preferably an elastomer, a thermoplastic or duroplastic consisting mainly of polymers such as known, for example, for the encapsulation of adsorber particles from DE-AS No. 33 04 349, and which have a selective permeability for the adsorbates, e.g. toxic agents, but are impermeable for sweat, washing agents, oils and fats. Dispersions of synthetic resins which are suitable for the purposes of the invention are, for example, polyurethane latices, such as Impranil DLN (Bayer), acrylate latices, such as the acronales (BASF), synthetic rubber latices, such as neoprene (Du Pont).

In order to prevent a phase separation during extrusion, i.e. the squeezing out of the water, swelling agents or thickening agents may be added to the mixture (cf. Rompp, Chemielexikon).

Depending on the desired application, a variety of substances may be admixed to the microspherules of activated carbon of the invention. Depending on their chemical nature and compatibility, these substances may be added as powder to the pulverulent carbon prior to the mixing with the binder dispersion in the extruder, they may serve for powdering or they may be incorporated in the synthetic resin dispersion. Usual flameproofing agents consist, for example, of finely-divided antimony trioxide in combination with compounds of bromine, e.g. decabromodiphenyl ether. The latter may, for instance, be already present in the synthetic resin of the dispersion, while the antimony trioxide, analogous to the activated carbon particles, may be kneaded together with the aqueous dispersion of the water-insoluble synthetic resin to form an intimate mixture, or may be utilized later on as powdering agent. The same applies to other known pulverulent modifiers or the adsorbent materials, already mentioned above.

· The macropores and mesopores of the activated carbon may be loaded with additives such as heavy metal catalysts, fireproofing agents, anti-bacterial or anti-fungal substances.

The loading of the activated carbon with enzymes, in particular before adding the binder, results in pellets of high enzymatic activity. The large molecules of the enzymes may also penetrate up to the mesopores, in borderline cases also up to the largest micropores and are there enclosed by the binder macromolecules; they are, however, still accessible for smaller molecules. The increase of concentration of the reagents caused by the adsorption on the activated carbon results in a high reaction rate. Finally, activated carbon contains practically always in sufficient amount the water necessary for many enzymatic reactions. Also specific catalysts, such as proposed, for example, for eliminating odor (intestinal gases of colostomy patients), may be added during the manufacture of the claimed molded carbon. One obtains a carbon suitable for hematocatharsis by adding during the preparation an anticoagulating agent (e.g. acetylsalicylic acid) and compounds of zirconium (for fixing phosphates).

It might be useful for special purposes to surround the spherules by a porous or spongy metal layer. This may be effected by means of conventional chemical or electrochemical methods. Accordingly, in Example 1 of EP-B No. 10 711, a nickel layer having a thickness of about 20 μm was applied. The adsorption kinetics was only slightly affected thereby. In contrast, chemical toxicants were destroyed during the very slow desorption.

In some caess, the molded carbon is metallized if, for example, the mere adsorption is not sufficient (gas mask filters) or specific catalytic effects are desired. However, a considerable portion of the salts is deposited near the surface which impairs both the adsorption itself as well as the action of the salts. It is possible according to the method of the invention to deposit metal salts already on the particles of the pulverulent activated carbon before the addition of the synthetic resin dispersion, so that they are very uniformly distributed in the produced microspherules.

Another decisive advantage of the method of the subject invention is that the modification by susceptible chemical or biological substances may be conducted with the pulverulent activated carbon and, hence, before the encapsulation which is associated with the shaping of the microspherules, all this being conducted at only moderately elevated temperatures at which these substances, e.g. enzymes, are not damaged.

The activated carbon microsperules of the invention can be used for every purpose for which fine molded carbon of the kind, though prepared in a different manner, has been used heretofore, for example, for fixed bed filters. By virtue of their symmetry, the micropherules of the invention can withstand mechanical strain better than other shapes and they have the highest volume/surface ratio, proportional to the diameter. This is particularly important for producing flexible flat-shaped filters, e.g. in the form of protective suits against chemical war gas. The preferred diameters of the spherules of from 0,3 are the optimum comprise between adsorption kinetics (proportional to the surface) and capacity (proportional to the colume).

EXAMPLE 1

A homogeneous mixture was prepared in a kneading machine consisting of the following components:

| | |
|---|---|
| ground activated carbon water content 25% by weight | 6350 g |
| polyurethane dispersion weight of the dry substance 45% (Impranil DLN) | 4650 g |
| water | 2570 g |
| lubricants (polyethylene oxide solution) M 740/1 (Plate) | 600 g |

This mass was extruded through a screen plate having holes of 0.5 mm diameter into strands. These strands were powdered with 2% activated carbon powder, based on the total weight, and shaped into spherules in a marumerizer. Said spherules were dried in a drum with a hot air stream. The proportion of microspherules having a diameter of from 280 to 630 μm was 90%.

EXAMPLE 2

50 kg of extremely finely milled activated carbon with a mean inner surface of 1400 m$^2$/g and a size distribution of

| up to | 3 | μm: | 6% | of total |
|---|---|---|---|---|
| " | 4 | " | 14 | " |
| " | 8 | " | 33 | " |
| " | 11 | " | 42 | " |
| " | 16 | " | 53 | " |
| " | 22 | " | 65 | " |
| " | 31 | " | 77 | " |
| " | 44 | " | 89 | " |
| " | 62 | " | 98 | " |
| " | 88 | " | 100 | " | were placed in a commercially available pelletizing mixer with an effective capacity of 150 l and equipped with a clockwise-rotating, sloping mixture container, a rotating vortexing tool, and a material baffle.

The activated powder carbon contained 25% water by weight. 35 kg of an acrylate dispersion containing 50% dried substance was added over 5 minutes. The vortexer was turned off and another 1 kg of activated-carbon powder was added to the still rotating mixture container. The resulting microspherules were dried in a drum drier. 39 kg of the dried microspherules with diameters of 0.1 to 0.6 mm, a yield of 75%, were sifted out. The inner surface of the product was still always 900 m²/g. The fines can be reused in the next charge with fresh activated-carbon powder.

EXAMPLE 3

Activated-charcoal powder suspended in an aqueous dispersion of acrylate as in Example 2 was sprayed into a commercially available spray-drying device with an evaporating capacity of 200 kg of water per hour. The binder and carbon and their ratio were also the same as in Example 2, although more water was added to obtain a viscosity of approximately 1000 cP. The hot-air temperature was approximately 400° C., the mean droplet trajectory approximately 10 m, and contact time approximately 15 seconds. Up to 75% spheres ranging from 0.2 to 0.5 mm were obtained (in terms of dry substance). The temperature of the spherules remained below 110° C. The activity was absolute comparable to that of the spheres from Examples 1 and 2.

It will be understood that the specification and examples are illustrative but not limitative of the present invention and that other embodiments within the spirit and scope of the invention will suggest themselves to those skilled in the art.

What is claimed:

1. A method for producing microspherules of activated carbon, comprising kneading activated carbon particles of a size below 100 μm, together with a dispersion of a water-insoluble synthetic resin to form an intimate mixture; pressing the mixture through a screen having holes related to the size of the desired microspherules; powdering the pressed material; and granulating and drying the resulting microspherules, the resulting microspherules having a diameter of from 0.1 to 1 mm.

2. A method according to claim 1, wherein the powdering is effected with graphite or activated carbon particles of a particle size below 100 μm.

3. A method according to claim 1, wherein the powdering is effected with a pulverulent fireproofing agent.

4. A method according to claim 1, wherein the powdering is effected with metal powders.

5. A method according to claim 1, wherein the powdering of the extruded strands is effected directly after they emerge out of the screen.

6. A method of manufacturing microspherules from activated carbon, comprising uniformly distributing activated carbon with a preponderant particle size of less than 20 μm through an aqueous dispersion of a synthetic resin that is insoluble in water and spray-drying the resulting mixture under conditions such that the temperature of the droplets or of the microspherules deriving therefrom does not exceed 120° C., the resulting microspherules having a diameter of from 0.1 to 1 mm.

* * * * *